United States Patent [19]

Dodson et al.

[11] Patent Number: 5,220,516
[45] Date of Patent: Jun. 15, 1993

[54] ASYNCHRONOUS STAGING OF OBJECTS BETWEEN COMPUTER SYSTEMS IN COOPERATIVE PROCESSING SYSTEMS

[75] Inventors: George W. Dodson, Colleyville; Michael O. Mitchell, Trophy Club, both of Tex.

[73] Assignee: International Business Machines Corp., Armonk, N.Y.

[21] Appl. No.: 312,222

[22] Filed: Feb. 21, 1989

[51] Int. Cl.⁵ .................................. G06F 13/00
[52] U.S. Cl. .................................. 364/514; 395/200; 395/800
[58] Field of Search ............... 364/514, 516, 200, 900; 340/825.5, 825.51, 825.52; 358/141, 142; 370/79, 84, 95.1; 395/275, 375, 200, 800

[56] References Cited

U.S. PATENT DOCUMENTS

| | | | |
|---|---|---|---|
| 4,292,669 | 9/1981 | Wollum et al. | 364/200 |
| 4,471,427 | 9/1984 | Harris | 364/200 |
| 4,593,324 | 6/1986 | Ohkubo et al. | 364/514 |
| 4,636,946 | 1/1987 | Hartung et al. | 364/200 |
| 4,649,533 | 3/1987 | Chorley et al. | 364/200 |
| 4,713,780 | 12/1987 | Schultz et al. | 364/514 |
| 4,727,495 | 2/1988 | Cheetham et al. | 364/514 |
| 4,750,135 | 6/1988 | Boilen | 364/514 |
| 4,811,207 | 3/1989 | Hikita et al. | 364/200 |
| 4,933,846 | 6/1990 | Humphrey et al. | 364/200 |
| 4,972,368 | 11/1990 | O'Brien et al. | 364/200 |

*Primary Examiner*—Parshotam S. Lall
*Assistant Examiner*—Michael Zanelli

[57] ABSTRACT

A distributed processing system that has a host and at least one connected work station. Each information object requested by the work station from the host is stored at the work station and is retained according to a predetermined hierarchy of priorities. When the work station initiates a request for an information object, the work station storage is first interrogated for the object and it is obtained therefrom if present. Only if the object is not in work station storage, is a request then transmitted to the host to obtain the information object.

8 Claims, 3 Drawing Sheets

ASYNCHRONOUS STAGING OF OBJECTS BETWEEN COMPUTER SYSTEMS IN COOPERATIVE PROCESSING SYSTEMS

BACKGROUND OF THE INVENTION

The present invention relates to distributed processing and more particularly to interchange of data in communication system having one or more host processors connected for cooperative interaction with a plurality of intelligent terminals or work stations.

Cooperative processing is well known in the art, illustrative of which are systems such as those depicted in FIG. 1 hereof, wherein a host processor is operative in a purely reactive mode to requests for objects (data and processing routines) requested by the connected terminal/work stations. While such systems provide substantial economies of equipment by providing for the sharing of selected computational features at a consolidated level, (i.e., at a host processor) they nevertheless require two flows of information for each item communicated from the host to a connected terminal/work station:

(1) The initiation of a request at the work station communicated over a data link to the host; and (2) Data generated or otherwise produced at the host and communicated over a data link back to the requesting terminal/work station.

When the host processor is busy, requests for information may await their turn in a queue, thereby resulting in significant delays. Moreover, even if there is no queue, and the request for data is responded to immediately upon receipt, there nevertheless is a loss of time occasioned by the need for the requesting terminal to transmit a request to the host together with loss of time involved in production of requested data and their communication by the host back to the terminal over the connecting link. Moreover, it is desirable further to improve the efficiency of time and equipment utilization in systems of the type described herein in order to provide a storage hierarchy within terminal work stations whereby the terminal work stations can anticipate the future need at the work station of certain types of data and or processing information (hereinafter referred to as "objects") and to have them stored at the work station so that such objects are available for utilization (display/processing) immediately upon request by the user without having to obtain them from the host, thereby substantially improving time efficiency and equipment utilization.

OBJECTS AND FEATURES

It is one general object of this invention to improve distributed data processing systems.

It is another object of this invention to improve time efficiency in utilization of intelligent work stations.

It is another object of this invention to improve efficiency of equipment utilization in distributed processing systems.

It is yet another object of this invention to facilitate utilization of the equipment and attendant productivity of equipment user personnel.

In accordance with one feature of the invention items requested by a given work station from the host are automatically retained in the storage of such work station in accordance with a predetermined order of priority.

In accordance with another feature of the invention, objects are retained in memory at the work stations until either: 1. a pre-determined period of time has passed without their being used; or 2. until the available memory at the terminal/work station is full and a higher priority item seeks entry thereto, thereby reducing response time and improving efficiency.

These and other objects and features of the invention will be apparent from the following detailed description, by way of preferred embodiment, with reference to the drawing.

DETAILED DESCRIPTION OF THE INVENTION

Figure 1:
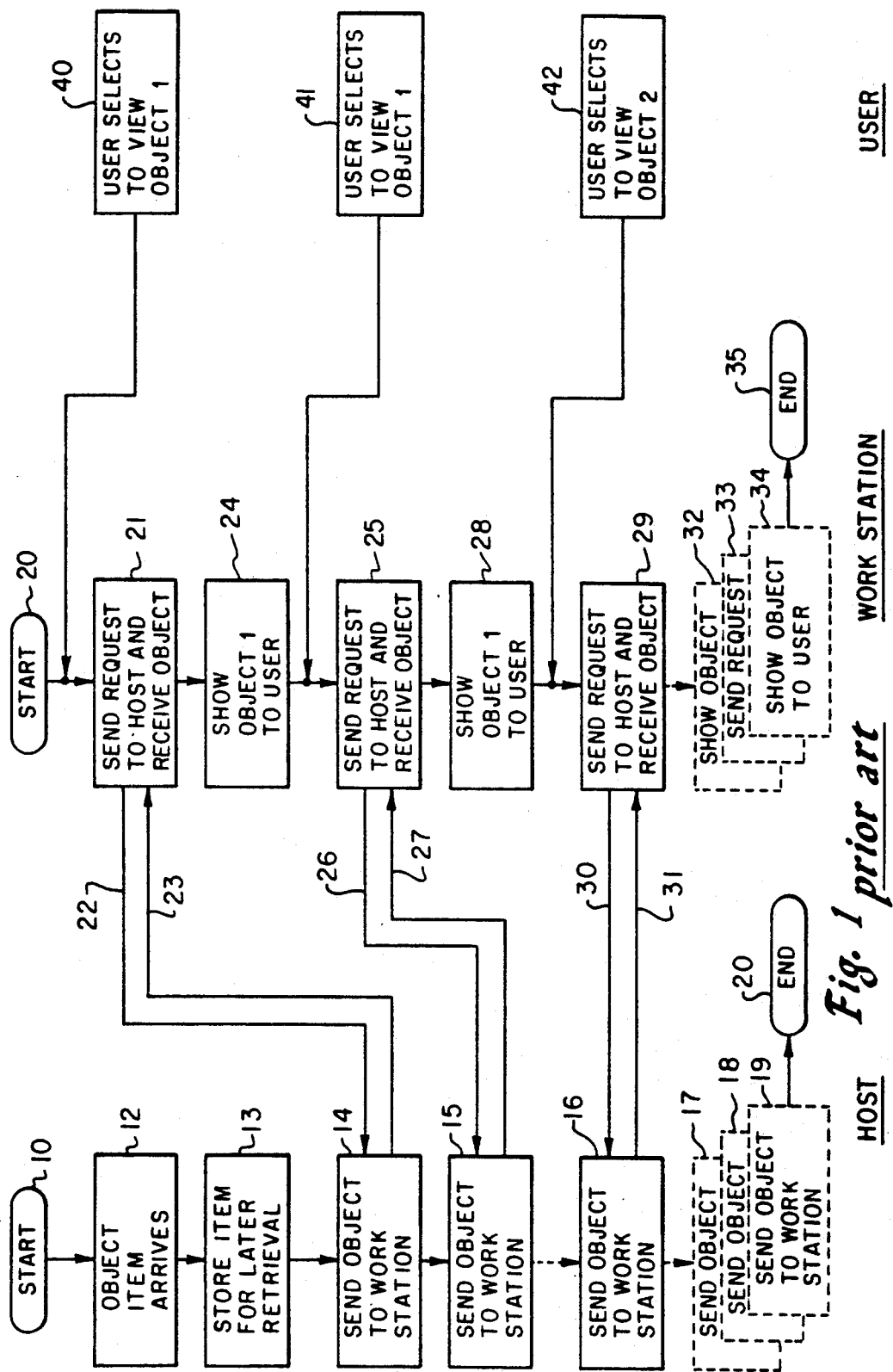
FIG. 1 is a flow chart illustrating operative principles embodied in the prior art.

Referring now to FIG. 1, a typical distributive processing system according to the prior art is illustrated. Steps progress operately in descending order from top to bottom and represent, by vertical column, the host processor, terminal/work station and user respectively. As will be observed from the top of the host column, action begins with starting of the host system and the terminal/work station(s) respectively. These actions are represented by start symbols 10 and 20. In this connection, it should be observed that reference to terminal and/or work station when used in the singular is intended to include the plural and vice versa unless the context requires otherwise.

Once the system is activated, objects are received at the host as represented by the descriptor "object item arrives", symbol 12. This is accomplished in accordance with generally known techniques. After arrival, the object item is stored at the host for later retrieval when a request is subsequently received from the user for such item.

When a user elects to view the object, e.g., object 1 as noted by symbol 40, he or she makes an appropriate entry, normally by manipulation of a keyboard or the like; and in response thereto, the work station develops and sends to the host a request for the object as denoted by symbol 21. Upon receiving such an input, the work station circuits transmit a request for the object over communication link 22 to the host processor with a request that the identified object be sent to the work station. This then is accomplished as represented by communication link 23, and the work station equipment accepts the requested object and then displays it to the user as noted by symbol 24. The item may be temporarily retained at the work station until the memory capacity is needed for the next item. Ordinarily, however, the item is not retained in storage at the work station and consequently must be recalled again from the host if it is to be viewed subsequently. This is represented by the sequence beginning with selection by the user to view the object as denoted by symbol 41. Circuits in the work station are then activated as denoted by symbol 25 and act in the manner similar to that denoted by symbol 21 to send a request to the host over transmission path 26 to circuits in the host which responds as noted by symbol 15 to send the requested object to the work station over communication link 27. The object is then displayed to the user as denoted by symbol 28.

Should the user desire to view a different object (e.g., object 2) a procedure similar to the foregoing is employed, with the user electing to view the object as denoted by symbol 42 to send a request to the host and receive the object as denoted by symbols 29, 30, 31 and 16. Other similar sequences of operation are represented by symbol 17, 18 and 19 at the host station and by symbols 32, 33 and 34 at the work station. Completion of the foregoing sequences or deactivation are denoted by symbols 20 and 35.

From the foregoing, it will be observed that in accordance with the prior art, after display of the object or utilization thereof by the work station, the object is not stored there but is retained at the host, thereby requiring subsequent individual retrievals of the object from the host for use or display.

Figure 2:
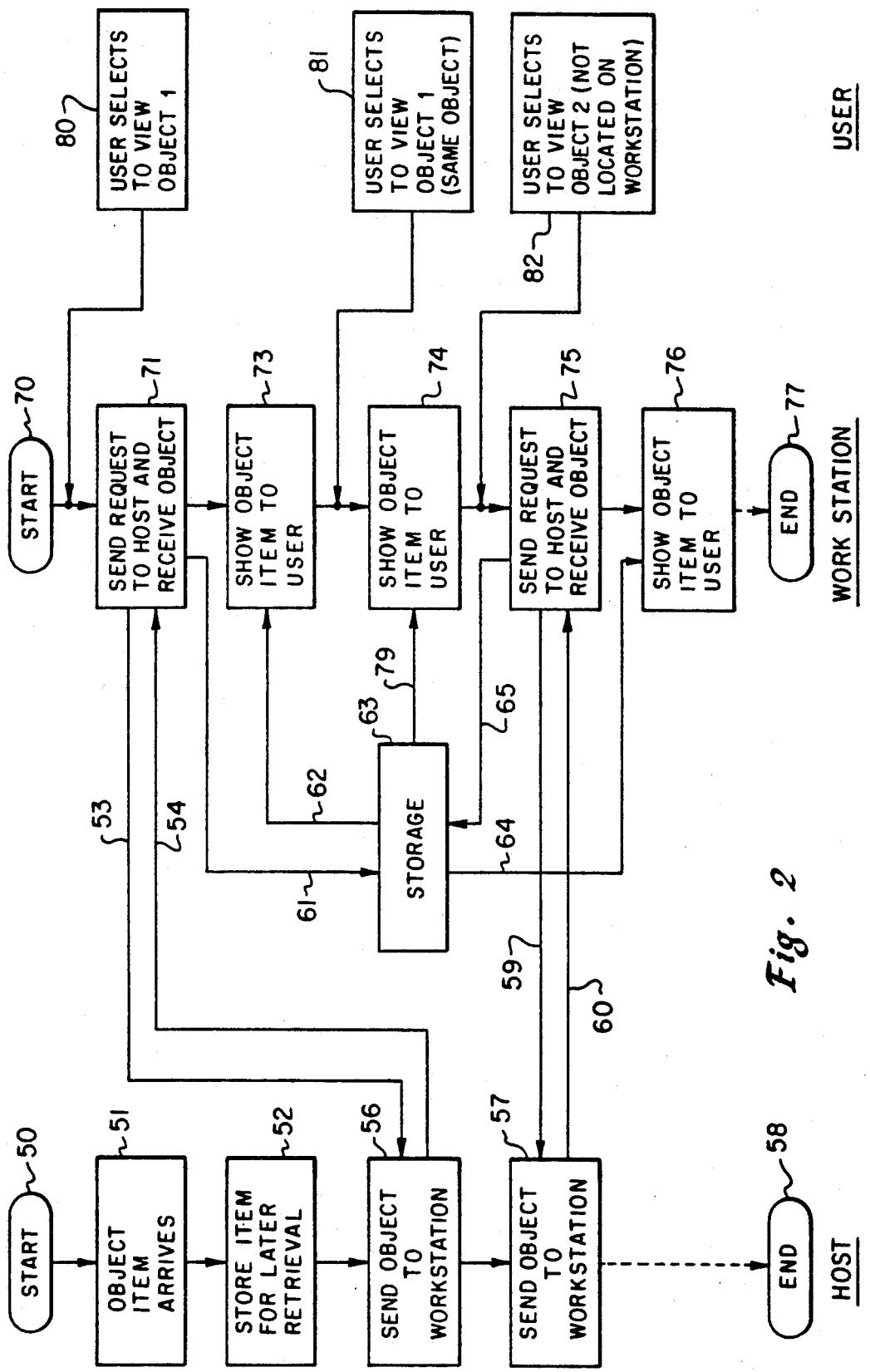
FIG. 2 is a flow chart illustating the preferred embodiment of the invention.

Now turning to FIG. 2, it will be observed that the present invention is illustrated therein. As with the prior art, the inventive system includes a host and one or more work stations. These are presented in a form similar to that of FIG. 1, and are activated by start-up which is indicated by symbols 50 and 70 respectively. As with the case of the prior art, objects are received and are represented by "object item arrives", symbol 51. Next, the memory 52 stores the object item in accordance with principles known in the prior art. The object is thus available for transmission to a work station upon request. Thus the host is conditioned to respond to a specific request from a work station and to send the object to the work station as represented by symbol 56.

Communication between the host circuits 56 and the corresponding work station circuits 71 is effected over communication links 53 and 54. Deactivation of the host system is of course, represented by "end" symbol 58.

As mentioned above, circuits at the work stations are equipped with sufficient storage capacity to store and retain objects ordinarily desired and/or used by the work station operators. Accordingly, after an object item has been received by circuits 71 or 75, it is stored in storage 63 (which is symbolic of memory or DASD at each work station) where it remains until, because of inactivity or need for replacement by an object of higher priority, it is erased therefrom. Paths inter-connecting circuits 71 and 75 with memory 63 are identified by communication paths 61 and 65.

As shown in FIG. 2, displays of requested objects, e.g., mail, to the user are identified by symbols 73, 74 and 76. Of course, it will be evident to those skilled in the art that these are representative of a number of different showings of the same or different objects.

Completion of a sequence of actions or eventual deactivation of the system is denoted by symbols 58 and 77 in the conventional manner.

Again as evident from inspection of FIG. 2, a work station user may select to view an object that is either currently resident within local storage 63 or which must be summoned from the host. However, it is not necessary for the user to know where the data is stored. Symbol 80 represents selection by the work station user to view one or more objects resident in host storage 52, symbol 81 identifies selection by the user of viewing the same object(s) which by then has been stored in work station storage 63, and symbol 82 identifies selection by the user of a different object (e.g., object 2) which must be summoned from the host processor. Thus, in accordance with a feature of the invention, two modes of operation are provided whereby the user can select items that are currently in the host only or in the host and work station storage.

Reference is herein made to co-pending U.S. patent application Ser. No. 07/312,223 filed on even date herewith by the inventors hereof and issued as U.S. Pat. No. 5,029,104 on Jul. 2, 1991 for "Prestaging Objects in a Distributed Environment." In that application reference is made to different types of data objects that are useful at local work stations such as those herein described.

In operation, a user selects to view an object, such as object 1. This is represented by symbol 80. In response to thereto, circuits 71 interrogate local storage 63 via conducting path 61 to ascertain whether or not the requested item is currently in local storage. If not, it then communicates via conductor 53 to host circuits 56 which respond by communicating the requested information via conducting path 54, to circuits 71 whence it is then shown to the user as indicated by symbol 73. At the same time, the item of information is communicated via path 61 to storage 63, where it is stored in accordance with the hereinafter described hierarchy of priorities.

If when the user selected to view object 1 as indicated by symbol 80, circuits 71 found the requested information currently in storage 63, it would have resulted in the communication of such information via communication link 62, to circuits exemplified by symbol 73 for display to the user.

Since in any event, the item is now stored within storage 63, when a user subsequently selects to view the same object as represented by symbol 81, the requested object is communicated from storage 63 to circuits 74 via link 79. The object is then displayed to the user.

When the user selects to view another object, e.g., object 2, as represented by symbol 82, circuits as represented by symbol 75, are activated to send a request via communication link 59, to circuits 57 where they are effective to result in the transmission of the requested data via link 60, to circuits 75. The object is then shown to the user as represented by symbol 76. As will be evident from a further inspection of the drawing, prior to sending a request to the host via communication links 59, circuits represented by symbol 75 interrogate storage 63, via link 65, to ensure that the requested object is not already in storage locally. If such should be the case, the requested object data is transmitted to circuit 76, by a link represented by symbol 64. If not then the object is obtained from the host via link 60, and the object will be stored in storage 63 via link 65.

Figure 3:
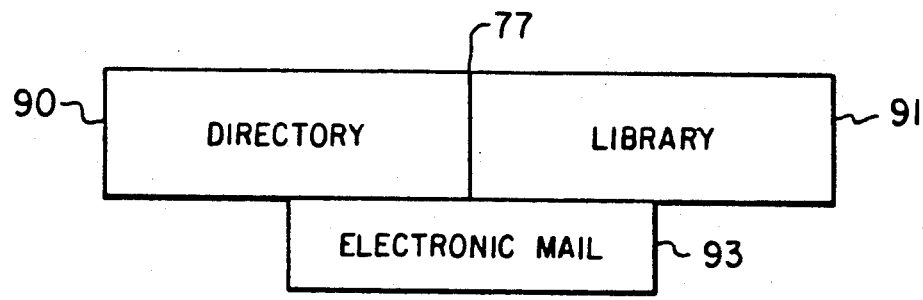
FIG. 3 is a diagram identifying two types of information for which the principles of the invention are particularly useful.

Now turning to FIG. 3, three categories of information are shown for which the principles of the invention are particularly efficacious These are "directory", "electronic mail" and "library". As will be evident to those skilled in the art, the directory 90 is for providing the user with a list of items such as names, addresses and telephone numbers which are of sufficient interest to the user to justify their inclusion in such a list. Of course, a directory may include other items of information such as routing information, building locations and the like which are necessary or desirable in identifying and/or achieving effective communication with a designee.

Electronic mail 93 is provided for storage of selected items of mail which are newly arrived, designated by the user for retention, or are being maintained at the work station for a predetermined or indeterminate interval of time. For additional information regarding electronic mail, reference is hereby made to the above identified co-pending application.

Library 91, symbolizes a storehouse of information such as articles of interest, references, bibliographies and the like; although it may, at the discretion of the user, include otehr kinds of information which the user designates for inclusion. Such items often include substantial quantities of data, and consequently their presence locally avoids the necessity of repetitively communicating substantial quantities of such data between the host and local work stations.

Figure 4:
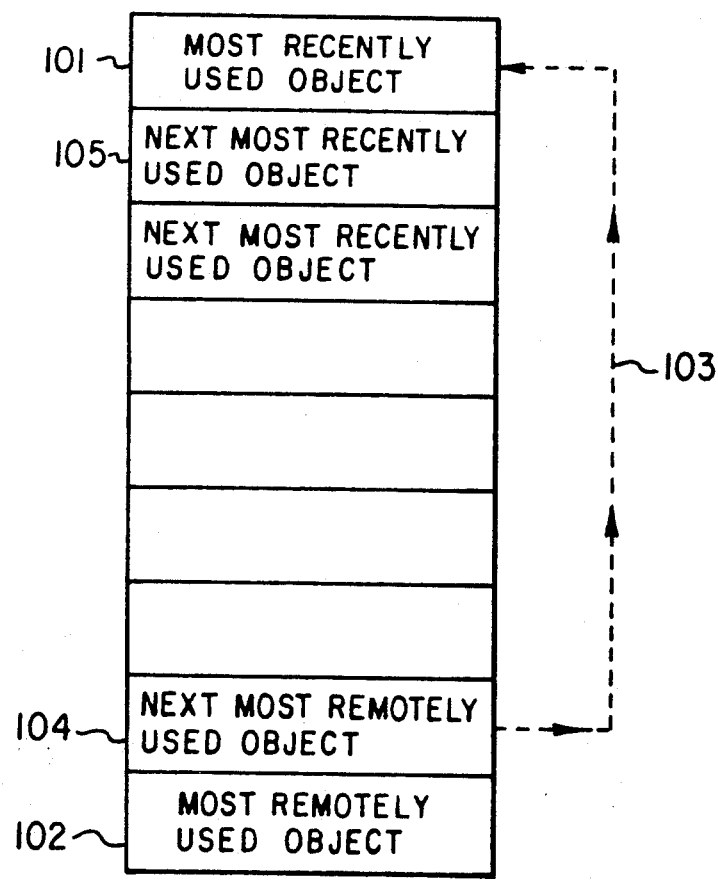
FIG. 4 illustrates the preferred hierarchy of retention priorities at the work stations.

In order to maximize the usefulness of available local storage (e.g., storage 63), a hierarchy of data retention priorities may be established. Such priority may be tailored to meet the requirements of the local user, but optionally provides for at least interim storage of the most recently received item which, if necessary because of overcrowding of available storage space, will displace an item or items of lowest priority. The order of hierarchies then is bascially time and use dependent in that recent use establishes or re-establishes a higher position within the priority queue, whereas lack of use gradually lowers the level of priority until an item, because of non-use, is displaced by a newly arrived item FIG. 4 illustrates the preferred hierarchy of retention priorities, preferably employed in practicing the invention. There, it will be observed, the most recently used object is accorded the highest priority for retention, whereas the most remotely used object is accorded the lowest retention priority. This is illustrated by the dashed line 103 according to which the next most remotely used object 104, if used after the most recently used object 101, then replaces it as the most recently used object 101. The replaced 101 becomes 105 as it is decreased in position to the second highest location as shown in the figure. When the next object is received by the work station, all of the items in the queue descend one position, resulting in the elimination of the lowest item 102 which then is lost from local memory. However, if before that occurs, item 102 were to be used, it would then be raised to the highest priority.

In summary, through the cooperative interaction of memories in both the host processor and the work stations, the most used data is stored at the work station locations and is immediately available thereat, thereby reducing the number of interactive communications required to support user needs and resulting in a corresponding improvement in efficiency and time reduction.

It will now be evident that what has been described herein a distributive processing system having substantially improved features. Although the inventive concepts hereof have been illustrated by way of a preferred embodiment, it will be evident to those skilled in the art that other adaptations and modifications may be employed without departing from the spirit and scope of the invention.

The terms and expressions herein employed are used as terms of description and not of limitation, and there is no intent in the use thereof to exclude equivalents, but on the contrary it is intended to include any and all equivalents, adaptations and modifications that can be employed without departing from the spirit and scope of the invention as described in the specification and claims herein.

What is claimed:

1. A data processing system having:
   (a) a host processor,
   (b) a work station connected to said host processor,
   (c) means connected to said host processor for inputting data objects to said host processor,
   (d) host processor means responsive to requests from said work station for transmitting requested ones of said data objects to said work station,
   (e) work station storage means responsive to receipt at said work station of said requested ones of said data objects for storing said requested ones of said data objects at said work station, and
   (f) means at said work station for establishing retention priorities in said work station storage means for said requested ones of said data objects according to a predetermined order of retention.

2. The data processing system according to claim 1 in which said host processor includes host storage means for storing said data objects at said host processor.

3. The data processing system according to claim 1 in which said host processor includes host storage means for storing said data objects.

4. The data processing system according to claim 1 in which said predetermined order of retention comprises ascribing to the most recently received data object a highest level of retention priority.

5. The data processing system according to claim 1 in which said predetermined order of retention comprises ascribing to the most recently used data object a predetermined upper level of retention priority.

6. The data processing system according to claim 1 in which said predetermined order of retention comprises ascribing to the most recently received data object a highest level of retention priority and to the most recently used data object a predetermined upper level of retention priority.

7. The data processing system according to claim 6 further including means for ascribing to the most remotely used data object a lowest level of retention priority.

8. The data processing system according to claim 1 further including means at said work station effective when a requested data object is not stored within said work station storage means for requesting said requested data object from said host processor.

* * * * *